US012155993B2

(12) United States Patent
Wang et al.

(10) Patent No.: US 12,155,993 B2
(45) Date of Patent: Nov. 26, 2024

(54) HIGH PITCH ENHANCED PASSIVE RADIATOR AND PASSIVE RADIATOR SPEAKER HAVING THE SAME

(71) Applicant: Wistron Corporation, New Taipei (TW)

(72) Inventors: Xiao-Qin Wang, New Taipei (TW); Li-Ping Pan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 156 days.

(21) Appl. No.: 17/852,473

(22) Filed: Jun. 29, 2022

(65) Prior Publication Data

US 2023/0292039 A1 Sep. 14, 2023

(30) Foreign Application Priority Data

Mar. 9, 2022 (TW) ................................. 111108649

(51) Int. Cl.
*H04R 1/28* (2006.01)
*H04R 1/02* (2006.01)
*H04R 17/00* (2006.01)

(52) U.S. Cl.
CPC ........... *H04R 1/2834* (2013.01); *H04R 1/025* (2013.01); *H04R 17/00* (2013.01)

(58) Field of Classification Search
CPC ....... H04R 1/2834; H04R 1/025; H04R 17/00
See application file for complete search history.

(56) References Cited

U.S. PATENT DOCUMENTS 10,341,763 B2 7/2019 Li et al.
2001/0031061 A1* 10/2001 Coombs ............... H04R 1/2834 381/337
2010/0220866 A1 9/2010 Hsu

FOREIGN PATENT DOCUMENTS

CN 210927968 U 7/2020
TW 477111 U * 4/2014 ......... H03H 9/02669
TW M477111 U 4/2014

OTHER PUBLICATIONS

Examination report dated Mar. 10, 2023, listed in related Taiwan patent application No. 111108649.

* cited by examiner

*Primary Examiner* — Sunita Joshi
(74) *Attorney, Agent, or Firm* — McClure, Qualey & Rodack, LLP

(57) ABSTRACT

A high pitch enhanced passive radiator is adapted to be utilized in a passive radiator speaker. The high pitch enhanced passive radiator includes a shell, a woofer, and the passive radiator speaker. The shell has a first slot and a second slot. The woofer is connected to the first slot. The passive radiator speaker is connected to the second slot and includes a flange, a piezoelectric speaker, and a counterweight plate. The piezoelectric speaker is connected to the flange. The projected area of the counterweight plate and the projected area of the piezoelectric speaker at least partially overlap with each other.

20 Claims, 7 Drawing Sheets

HIGH PITCH ENHANCED PASSIVE RADIATOR AND PASSIVE RADIATOR SPEAKER HAVING THE SAME

CROSS-REFERENCE TO RELATED APPLICATION

This non-provisional application claims priority under 35 U.S.C. § 119(a) to Patent Application No. 111108649 filed in Taiwan, R.O.C. on Mar. 9, 2022, the entire contents of which are hereby incorporated by reference.

BACKGROUND

Technical Field

The present disclosure relates to a passive radiator, in particular to a high pitch enhanced passive radiator and a passive radiator speaker having the same.

Related Art

In general, a speaker known to the inventor has a woofer and a passive board, and the passive board will only perform enhancement on the bass part. Therefore, the speaker has to be additionally provided with a tweeter to increase the high-frequency sound quality, resulting in an increase in the volume of the speaker and additional costs.

SUMMARY

In view of this, according to one embodiment, a high pitch enhanced passive radiator is provided and comprises a flange, a piezoelectric speaker, and a counterweight plate. The piezoelectric speaker is connected to the flange. The projected area of the counterweight plate and the projected area of the piezoelectric speaker at least partially overlap with each other.

In some embodiments, the flange comprises an inner ring, the piezoelectric speaker is connected to the inner ring, and the counterweight plate is connected to a surface of the piezoelectric speaker opposite to the inner ring.

In some embodiments, the high pitch enhanced passive radiator further comprises a washer. The flange comprises an inner ring, and the piezoelectric speaker is connected to the inner ring. The washer is connected to a surface of the piezoelectric speaker opposite to the inner ring. The counterweight plate is connected to a surface of the washer opposite to the piezoelectric speaker.

In some embodiments, the flange comprises an inner ring, the counterweight plate is connected to the inner ring, and the piezoelectric speaker is connected to a surface of the counterweight plate opposite to the inner ring.

In some embodiments, the flange comprises an inner ring, the piezoelectric speaker is connected to the inner ring, and the counterweight plate is connected to a surface of the inner ring opposite to the piezoelectric speaker.

According to one embodiment, a passive radiator speaker is provided and comprises a shell, a woofer, and the high pitch enhanced passive radiator. The woofer 230 and the passive radiator 100 are received in the shell 210. The high pitch enhanced passive radiator is adjacent to the woofer, and the high pitch enhanced passive radiator comprises the flange, the piezoelectric speaker, and the counterweight plate. The piezoelectric speaker is connected to the flange.

The projected area of the counterweight plate and the projected area of the piezoelectric speaker at least partially overlap with each other.

DETAILED DESCRIPTION

Figure 1:
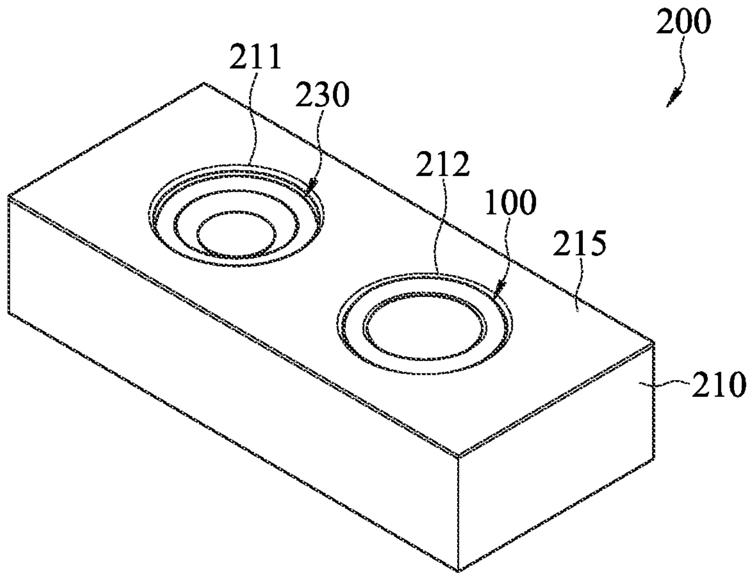
FIG. 1 illustrates a perspective view of a passive radiator speaker according to a first embodiment.
Figure 2:
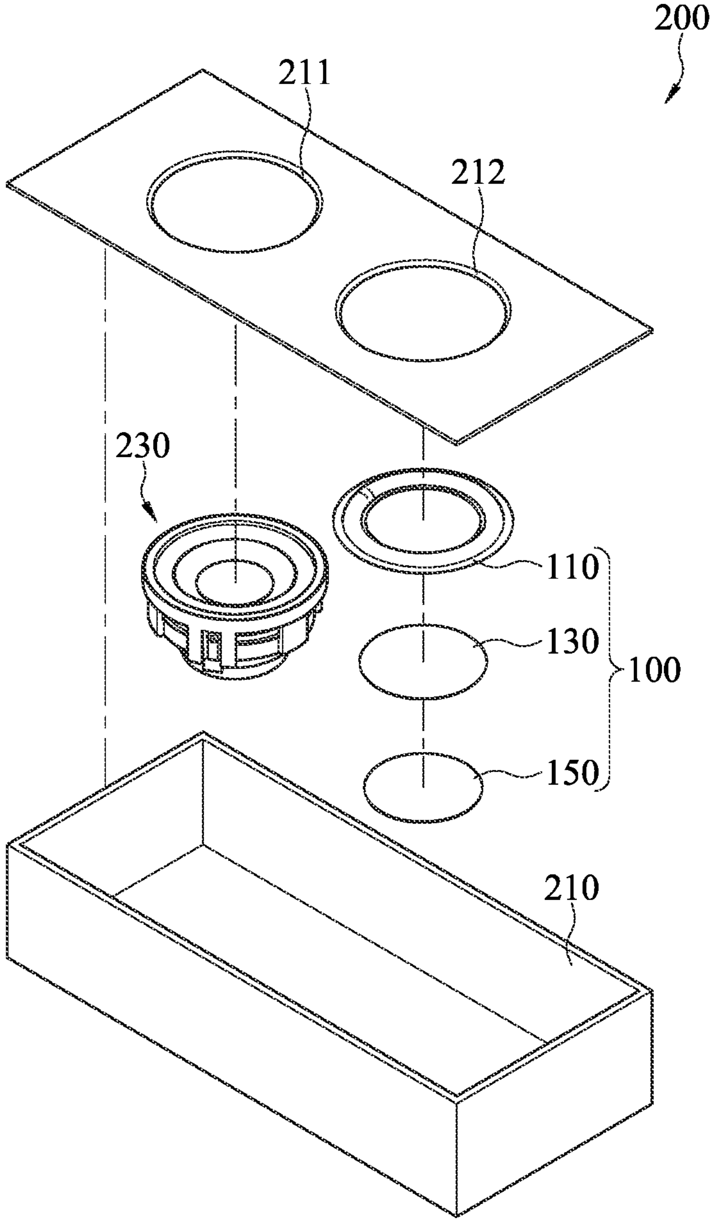
FIG. 2 illustrates an exploded view of the passive radiator speaker according to the first embodiment.
Figure 3:
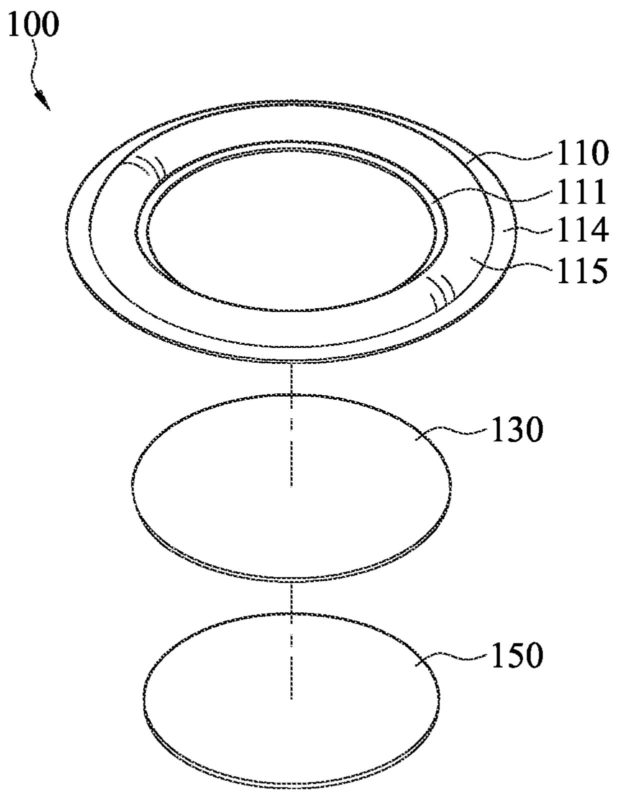
FIG. 3 illustrates an exploded view of a high pitch enhanced passive radiator according to the first embodiment.

Please refer to FIG. 1 to FIG. 3. FIG. 1 illustrates a perspective view of a passive radiator speaker according to a first embodiment. FIG. 2 illustrates an exploded view of the passive radiator speaker according to the first embodiment. FIG. 3 illustrates an exploded view of a high pitch enhanced passive radiator according to the first embodiment. As shown in FIG. 3, a high pitch enhanced passive radiator 100 comprises a flange 110, a piezoelectric speaker 130, and a counterweight plate 150. The high pitch enhanced passive radiator 100 is referred to as the passive radiator 100 hereinafter. In one embodiment, the passive radiator 100 refers to a speaker without a voice coil. The passive radiator 100 and an active speaker with a voice coil are arranged in the same enclosed shell. When the active speaker vibrates, because the elastic coefficients of the passive radiator 100 and the shell are different, the resonance point has a lower frequency, so that the low frequency is enhanced. In this way, by using the piezoelectric speaker 130 of the passive radiator 100, both the low frequency and the high frequency are enhanced at the same time, so that the sound quality of the speaker can be much greater. Here, the vibration principles of the active speaker and the piezoelectric speaker are different. The voice coil unit of the active speaker drives the diaphragm to produce sounds by using the force generated by the interaction between the magnetic field generated by the coil and the magnetic fields in the magnetic gap. On the other hand, in the piezoelectric speaker 130, the piezoelectric material are separated into two poles and electrified, so that the piezoelectric material is stretched to produce sounds.

The piezoelectric speaker 130 is connected to the flange 110. In one embodiment, the flange 110 has an outer ring 114, an inner ring 111, and a raised portion 115, and the raised portion 115 is between the outer ring 114 and the inner ring 111. In one embodiment, the piezoelectric speaker 130 comprises a support sheet and a piezoelectric material, the piezoelectric material is attached to the support sheet. The piezoelectric material is a mixture of materials with piezoelectric properties (for example, barium titanate, lead zirconate titanate, modified lead zirconate titanate, lead metaniobate, lead barium lithium niobate, and modified lead titanate). The material of the support sheet is, for example, a metal or a plastic. The piezoelectric speaker 130 performs the equalization effect through the cooperation of the support sheet and the piezoelectric material.

The projected area of the counterweight plate 150 and the projected area of the piezoelectric speaker 130 at least partially overlap with each other. In one embodiment, as shown in FIG. 3, the flange 110, the piezoelectric speaker 130, and the counterweight plate 150 are coaxially disposed with each other, and the projected area of the piezoelectric speaker 130 and the projected area of the counterweight plate 150 at least partially overlap with each other on a surface perpendicular to the axial direction.

Figure 10:
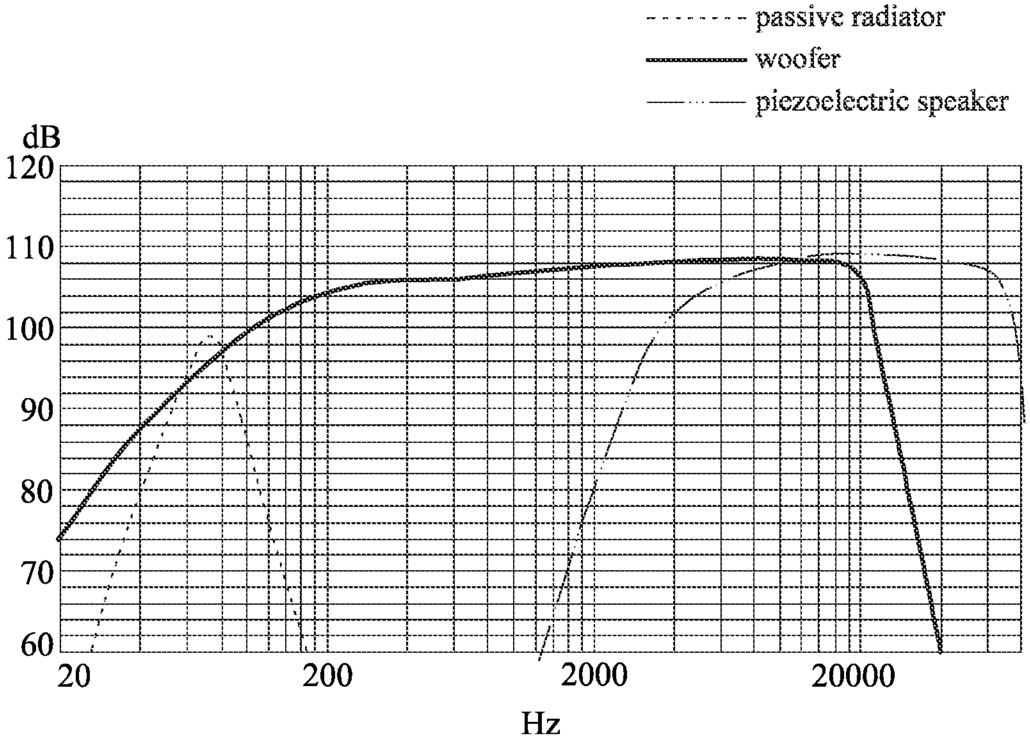
FIG. 10 illustrates a schematic view showing the effect of the passive radiator speaker according to the first embodiment.

Please refer to FIG. 10. FIG. 10 illustrates a schematic view showing of the effect of the passive radiator speaker according to the first embodiment. By arranging the piezoelectric speaker 130 on the counterweight plate 150, the counterweight plate 150 of the passive radiator 100 not only has the effect of enhancing the low-frequency sound quality but also has the effect of enhancing the high-frequency sound quality. As shown in FIG. 10, the horizontal axis represents frequency, the vertical axis represents volume, the solid line represents the woofer, the dashed line represents the passive radiator, and the three-dot chain line represents the piezoelectric speaker. Specifically, since the sounds produced by the woofer will loss at high frequencies (as shown in FIG. 10, the volume of the solid line decreases in the high frequency region), the sound quality of the woofer can only be maintained at low and medium frequencies. As a result, the high-frequency sound quality of the woofer cannot be expressed properly. Therefore, in one or some embodiments, through the piezoelectric speaker 130, the performance of high-frequency sound quality is increased, and therefore the performance of sound quality is improved. In addition, through the counterweight plate 150, the low-frequency sound quality of the passive radiator can be also enhanced.

In one embodiment, the shape of the flange 110 is a circle, an ellipse, or a rectangle, and the shapes of the piezoelectric speaker 130 and the counterweight plate 150 correspond to the flange 110. For example, as shown in FIG. 3, the shape of the flange 110 is the circle, and correspondingly the shapes of the piezoelectric speaker 130 and the counterweight plate 150 are also circle, but embodiments are not limited thereto; the shapes of these components can also be adjusted according to product requirements.

Figure 4A:
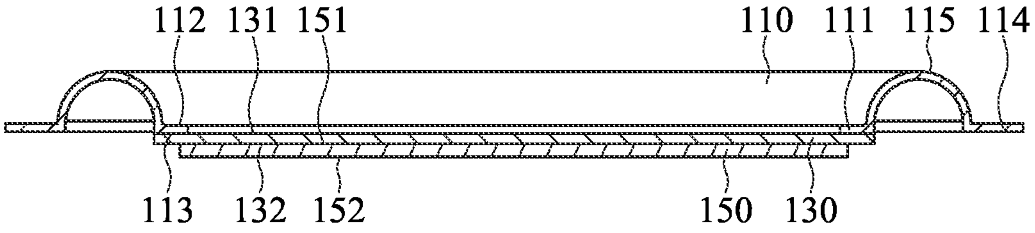
FIG. 4A illustrates a sectional view of the high pitch enhanced passive radiator according to the first embodiment.
Figure 4B:
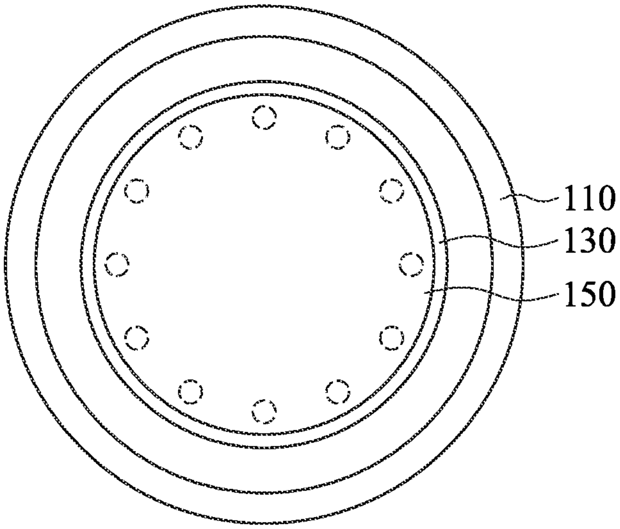
FIG. 4B illustrates a schematic connection view (1) of the high pitch enhanced passive radiator according to the first embodiment.
Figure 4C:
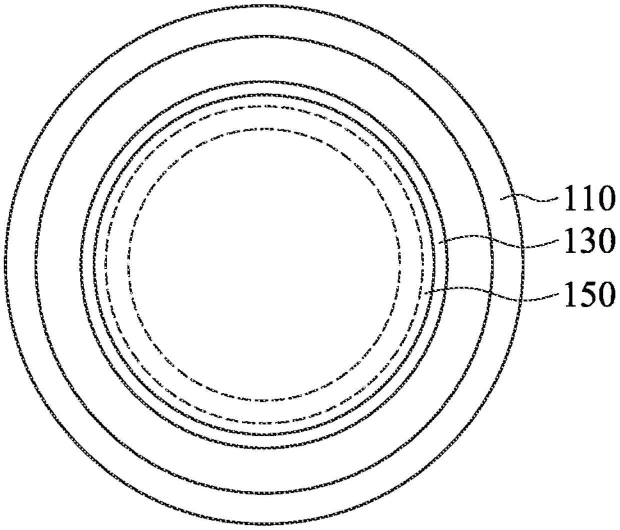
FIG. 4C illustrates a schematic connection view (2) of the high pitch enhanced passive radiator according to the first embodiment.
Figure 5:
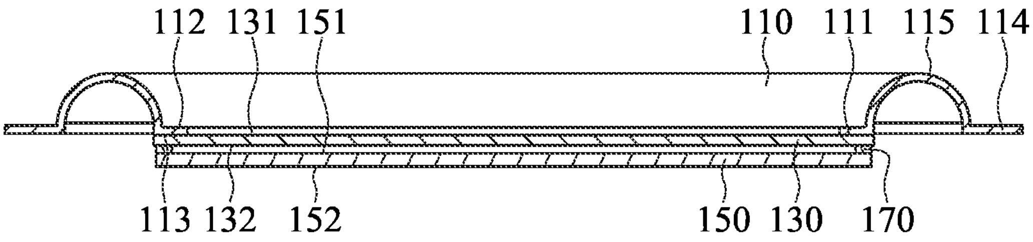
FIG. 5 illustrates a sectional view of the high pitch enhanced passive radiator according to a second embodiment.
Figure 6:
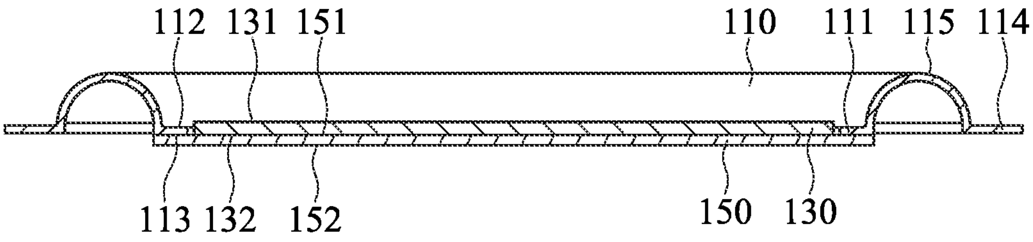
FIG. 6 illustrates a sectional view of the high pitch enhanced passive radiator according to a third embodiment.
Figure 7:
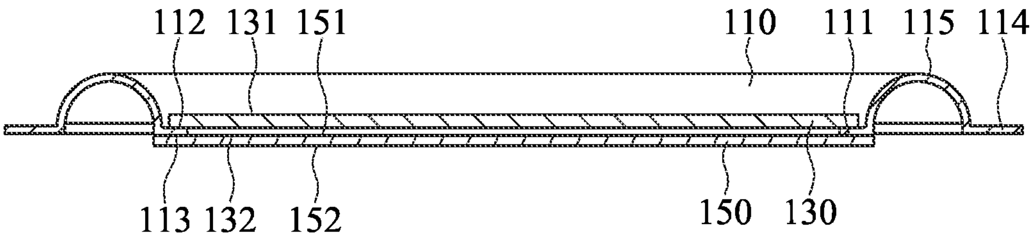
FIG. 7 illustrates a sectional view of the high pitch enhanced passive radiator according to a fourth embodiment.

Please refer to FIG. 4A to FIG. 7. FIG. 4A illustrates a sectional view of the high pitch enhanced passive radiator according to the first embodiment. FIG. 4B illustrates a schematic connection view (1) of the high pitch enhanced passive radiator according to the first embodiment. FIG. 4C illustrates a schematic connection view (2) of the high pitch enhanced passive radiator according to the first embodiments. FIG. 5 illustrates a sectional view of the high pitch enhanced passive radiator according to a second embodiment. FIG. 6 illustrates a sectional view of the high pitch enhanced passive radiator according to a third embodiment. FIG. 7 illustrates a sectional view of the high pitch enhanced passive radiator according to a fourth embodiment. The connection between the flange 110, the piezoelectric speaker 130, and the counterweight plate 150 has various embodiments.

As shown in FIG. 4A, in one embodiment, the flange 110 comprises the inner ring 111, the piezoelectric speaker 130 is connected to the inner ring 111, and the counterweight plate 150 is connected to a surface of the piezoelectric speaker 130 opposite to the inner ring 111. Specifically, in this embodiment, the inner ring 111 comprises a first ring surface 112 and a second ring surface 113 opposite to the first ring surface 11. The counterweight plate 150 comprises a first plate surface 151 and a second plate surface 152 opposite to the first plate surface 151. The piezoelectric speaker 130 comprises a first surface 131 and a second surface 132 opposite to the first surface 131. As shown in FIG. 4, the first surface 131 of the piezoelectric speaker 130 is connected to the second ring surface 113 of the inner ring 111, and the first plate surface 151 of the counterweight plate 150 is connected to the second surface 132 of the piezoelectric speaker 130. In this way, the counterweight plate 150 is connected to the piezoelectric speaker 130 in a direct-connection manner. As shown in FIG. 4B and FIG. 4C, in one embodiment, the counterweight plate 150 and the piezoelectric speaker 130 are connected by sticking. Specifically, in this embodiment, by partial sticking, such as point-to-point (as shown in FIG. 4B) or line-to-line (as shown in FIG. 4C), the counterweight plate 150 and the piezoelectric speaker 130 are not completely attached with each other, so that the counterweight plate 150 and the piezoelectric speaker 130 can vibrate with respect to each other.

As shown in FIG. 5, in one embodiment, the passive radiator 100 further comprises a washer 170. The piezoelectric speaker 130 is connected to the inner ring 111. The washer 170 is connected to a surface of the piezoelectric speaker 130 opposite to the inner ring 111. The counterweight plate 150 is connected to a surface of the washer 170 opposite to the piezoelectric speaker 130. Specifically, in this embodiment, the first surface 131 of the piezoelectric speaker 130 is connected to the second ring surface 113 of the inner ring 111. The washer 170 is connected to the second surface 132 of the piezoelectric speaker 130. The first plate surface 151 of the counterweight plate 150 is connected to the washer 170. In one embodiment, the washer 170 is a hollow annular-shaped thin plate. In this way, the counterweight plate 150 and the piezoelectric speaker 130 are indirectly connected with each other through the washer 170, so that a gap is between the counterweight plate 150 and the piezoelectric speaker 130, and the counterweight plate 150 and the piezoelectric speaker 130 can vibrate with respect to each other.

As shown in FIG. 6, in one embodiment, the counterweight plate 150 is connected to the inner ring 111, and the piezoelectric speaker 130 is connected to a surface of the counterweight plate 150 opposite to the inner ring 111. Specifically, in this embodiment, the periphery of the first plate surface 151 of the counterweight plate 150 is connected to the second ring surface 113 of the inner ring 111. The second surface 132 of the piezoelectric speaker 130 is connected to the first plate surface 151 of the counterweight plate 150. In this way, the counterweight plate 150 is connected to the piezoelectric speaker 130 in an indirect-connection manner.

As shown in FIG. 7, in one embodiment, the piezoelectric speaker 130 is connected to the inner ring 111, and the counterweight plate 150 is connected to a surface of the inner ring 111 opposite to the piezoelectric speaker 130. Specifically, in this embodiment, the second surface 132 of the piezoelectric speaker 130 is connected to the first ring surface 112 of the inner ring 111. The first plate surface 151 of the counterweight plate 150 is connected to the second ring surface 113 of the inner ring 111. In this way, the counterweight plate 150 and the piezoelectric speaker 130 are indirectly connected with each other through the inner ring 111, so that a gap is between the counterweight plate 150 and the piezoelectric speaker 130, and the counterweight plate 150 and the piezoelectric speaker 130 can vibrate with respect to each other.

Figure 8:
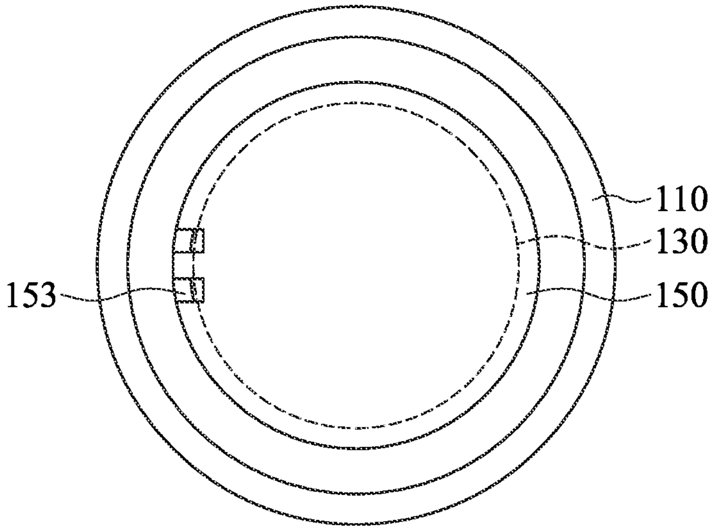
FIG. 8 illustrates a bottom view of the high pitch enhanced passive radiator according to the third embodiment.
Figure 9:
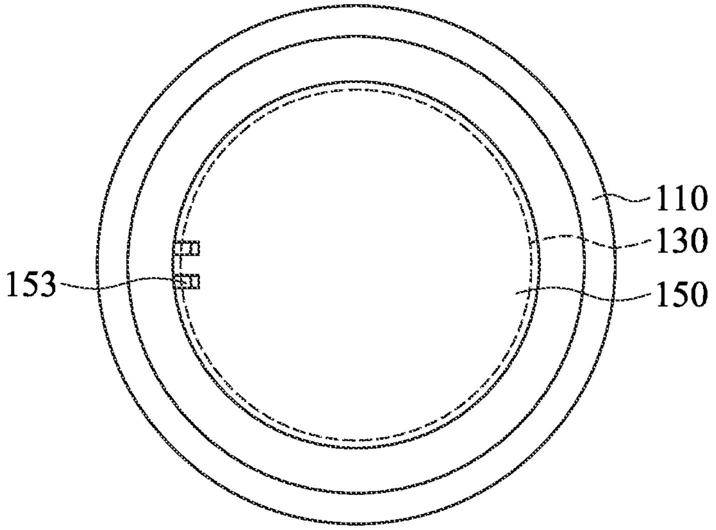
FIG. 9 illustrates a bottom view of the high pitch enhanced passive radiator according to the fourth embodiment.

Please refer to FIG. 8 and FIG. 9. FIG. 8 illustrates a bottom view of the high pitch enhanced passive radiator according to the third embodiment. FIG. 9 illustrates a bottom view of the high pitch enhanced passive radiator according to the fourth embodiment. As shown in FIG. 8 and FIG. 9, the size of the counterweight plate 150 is greater than the size of the piezoelectric speaker 130, so that the counterweight plate 150 covers the piezoelectric speaker 130. Therefore, in one embodiment, the counterweight plate 150 has a slot 153 (as show in FIG. 8 and FIG. 9) or a through hole. Specifically, in one embodiment, since the counterweight plate 150 covers the piezoelectric speaker 130, when wires are wiring to the piezoelectric speaker 130, the wires can pass through the slot 153 or through holes to be connected to the piezoelectric speaker 130.

Please refer to FIG. 1 and FIG. 2 again, the structures about the passive radiator 100 will not be described again. In one embodiment, the passive radiator 100 may be applied to a shell, and a passive radiator speaker 200 is thus provided. The passive radiator speaker 200 comprises a shell 210, a woofer 230, and the passive radiator 100. The woofer 230 and the passive radiator 100 are received in the shell 210. The passive radiator 100 is adjacent to the woofer 230. Through the cooperation of the passive radiator 100 and the woofer 230, when the passive radiator speaker 200 produces sounds, the low frequency of the woofer 230 can be enhanced through the counterweight plate 150 of the passive radiator 100. In addition, the sounds in high frequency of the passive radiator speaker 200 can be enhanced by the piezoelectric speaker 130 at the same time. In this way, the passive radiator speaker 200 can provide a better tone quality. In one embodiment, the shell 210 has a first slot 211 and a second slot 212, the woofer 230 is in the first slot 211, and the passive radiator 100 is in the second slot 212. Specifically, in this embodiment, the shell 210 comprises a cover plate 215, and the first slot 211 and the second slot 212 are opened on the cover plate 215. The woofer 230 is attached to the first slot 211, and the passive radiator 100 is attached to the second slot 212. Then, wires are welded to the circuit board of the woofer 230 and the passive radiator 100, and the cover plate 215 is attached to the shell 210 to complete the assembling of the speaker.

Based on the above, the high pitch enhanced passive radiator 100 and the passive radiator speaker 200 are provided. According to one embodiment, by arranging the piezoelectric speaker 130 on the counterweight plate 150, the counterweight plate 150 of the high pitch enhanced passive radiator 100 not only has the effect of enhancing the low-frequency sound quality but also has the effect of enhancing the high-frequency sound quality. In addition, according one embodiment, in the passive radiator speaker 200, the high pitch enhanced passive radiator 100 is utilized to be received in the shell 210, the low frequency of the woofer 230 is enhanced by using the counterweight plate 150, and the sounds in high frequency of the passive radiator speaker 200 can be enhanced by the piezoelectric speaker 130. Therefore, in one embodiment, the tweeter in the speaker known to the inventor can be integrated with the counterweight plate 150 to reduce the costs and weight of the speaker product.

What is claimed is:

1. A high pitch enhanced passive radiator, comprising:
a flange, comprises an inner ring;
a piezoelectric speaker connected to the inner ring of the flange; and
a counterweight plate, vibratingly connected to the piezoelectric speaker relative to the piezoelectric speaker;
wherein the projected area of the counterweight plate and the projected area of the piezoelectric speaker at least partially overlap with each other.

2. The high pitch enhanced passive radiator according to claim 1, wherein the piezoelectric speaker is connected to the inner ring, and the counterweight plate is connected to a surface of the piezoelectric speaker opposite to the inner ring.

3. The high pitch enhanced passive radiator according to claim 1, further comprising a washer, wherein the piezoelectric speaker is connected to the inner ring; the washer is connected to a surface of the piezoelectric speaker opposite to the inner ring; the counterweight plate is connected to the surface of the washer opposite to the piezoelectric speaker.

4. The high pitch enhanced passive radiator according to claim 1, wherein the counterweight plate is connected to the inner ring, and the piezoelectric speaker is connected to a surface of the counterweight plate opposite to the inner ring.

5. The high pitch enhanced passive radiator according to claim 1, wherein the piezoelectric speaker is connected to the inner ring, and the counterweight plate is connected to a surface of the inner ring opposite to the piezoelectric speaker.

6. The high pitch enhanced passive radiator according to claim 5, wherein the size of the counterweight plate is greater than the size of the piezoelectric speaker.

7. The high pitch enhanced passive radiator according to claim 6, wherein the counterweight plate has a slot or a through hole.

8. The high pitch enhanced passive radiator according to claim 1, wherein the flange has an outer ring, and a raised portion, and the raised portion is between the outer ring and the inner ring.

9. The high pitch enhanced passive radiator according to claim 1, wherein the shape of the flange is a circle, an ellipse, or a rectangle, and the shapes of the piezoelectric speaker and the counterweight plate correspond to the flange.

10. A passive radiator speaker, comprising:
a shell
a woofer received in the shell; and
a high pitch enhanced passive radiator received in the shell, wherein the high pitch enhanced passive radiator is adjacent to the woofer, and the high pitch enhanced passive radiator comprises:
a flange, comprises an inner ring;
a piezoelectric speaker connected to the inner ring of the flange; and
a counterweight plate, vibratingly connected to the piezoelectric speaker relative to the piezoelectric speaker;

wherein the projected area of the counterweight plate and the projected area of the piezoelectric speaker at least partially overlap with each other.

11. The passive radiator speaker according to claim 10, wherein the piezoelectric speaker is connected to the inner ring, and the counterweight plate is connected to a surface of the piezoelectric speaker opposite to the inner ring.

12. The passive radiator speaker according to claim 10, further comprising a washer, wherein the piezoelectric speaker is connected to the inner ring; the washer is connected to a surface of the piezoelectric speaker opposite to the inner ring; the counterweight plate is connected to a surface of the washer opposite to the piezoelectric speaker.

13. The passive radiator speaker according to claim 10, wherein the counterweight plate is connected to the inner ring, and the piezoelectric speaker is connected to a surface of the counterweight plate opposite to the inner ring.

14. The passive radiator speaker according to claim 10, wherein the piezoelectric speaker is connected to the inner ring, and the counterweight plate is connected to a surface of the inner ring opposite to the piezoelectric speaker.

15. The passive radiator speaker according to claim 14, wherein the size of the counterweight plate is greater than the size of the piezoelectric speaker.

16. The passive radiator speaker according to claim 15, wherein the counterweight plate has a slot or a through hole.

17. The passive radiator speaker according to claim 10, wherein the flange has an outer ring and a raised portion, and the raised portion is between the outer ring and the inner ring.

18. The passive radiator speaker according to claim 10, wherein the shape of the flange is a circle, an ellipse, or a rectangle, and the shapes of the piezoelectric speaker and the counterweight plate correspond to the flange.

19. The passive radiator speaker according to claim 10, wherein the shell has a first slot and a second slot, the woofer is in the first slot, and the high pitch enhanced passive radiator is in the second slot.

20. The passive radiator speaker according to claim 19, wherein the shell further comprises a cover plate, the cover plate is assembled on the shell, and the first slot and the second slot are opened on the cover plate.

* * * * *